(12) United States Patent
Chang et al.

(10) Patent No.: US 9,193,898 B2
(45) Date of Patent: Nov. 24, 2015

(54) ENVIRONMENTALLY FRIENDLY DISPERSION SYSTEM USED IN THE PREPARATION OF INVERSE EMULSION POLYMERS

(75) Inventors: Kin-Tai Chang, Sugar Land, TX (US); Kirk E. Wells, Sugar Land, TX (US); Jesse V. Mello, Missouri City, TX (US)

(73) Assignee: Nalco Company, Naperville, IL (US)

( * ) Notice: Subject to any disclaimer, the term of this patent is extended or adjusted under 35 U.S.C. 154(b) by 939 days.

(21) Appl. No.: 13/155,848

(22) Filed: Jun. 8, 2011

(65) Prior Publication Data

US 2012/0316090 A1 Dec. 13, 2012

(51) Int. Cl.
| | |
|---|---|
| *C09K 8/588* | (2006.01) |
| *C09K 8/68* | (2006.01) |
| *C09K 8/528* | (2006.01) |
| *C09K 8/74* | (2006.01) |
| *C09K 8/88* | (2006.01) |
| *C08F 220/56* | (2006.01) |
| *C08F 220/58* | (2006.01) |

(52) U.S. Cl.
CPC ............... *C09K 8/528* (2013.01); *C08F 220/56* (2013.01); *C09K 8/68* (2013.01); *C09K 8/74* (2013.01); *C09K 8/882* (2013.01); *C08F 220/58* (2013.01); *C09K 2208/12* (2013.01); *C09K 2208/22* (2013.01); *C09K 2208/28* (2013.01)

(58) Field of Classification Search
CPC .......... C09K 8/32; C09K 8/502; C09K 8/565; C09K 8/927; C09K 8/937
USPC .......................... 507/203, 226, 236, 905, 937
See application file for complete search history.

(56) References Cited

U.S. PATENT DOCUMENTS

| | | | |
|---|---|---|---|
| 3,284,393 A | 11/1966 | Vanderhoff et al. | |
| 3,535,174 A | 10/1970 | Bornstein | |
| 3,826,771 A | 7/1974 | Anderson et al. | |
| 4,024,097 A | 5/1977 | Slovinsky et al. | |
| 4,147,681 A | 4/1979 | Lim et al. | |
| 4,308,081 A | 12/1981 | Binet et al. | |
| 4,357,184 A | 11/1982 | Binet et al. | |
| 4,473,418 A | 9/1984 | Bampfield et al. | |
| 4,507,161 A | 3/1985 | Sujansky et al. | |
| 4,602,970 A | 7/1986 | Stigsson | |
| 4,672,090 A | 6/1987 | Chan | |
| 4,739,008 A * | 4/1988 | Robinson et al. | 524/801 |
| 4,806,610 A * | 2/1989 | Erickson | 527/201 |
| 4,906,701 A | 3/1990 | Clark, Jr. | |
| 4,943,389 A | 7/1990 | Weete et al. | |
| 5,008,037 A | 4/1991 | Weete et al. | |
| 5,025,004 A * | 6/1991 | Wu et al. | 514/165 |
| 5,206,316 A | 4/1993 | Chuang | |
| 5,622,649 A | 4/1997 | Hunter et al. | |
| 6,414,080 B1 | 7/2002 | Loeffler et al. | |
| 2003/0118614 A1* | 6/2003 | Sieverding et al. | 424/400 |
| 2004/0102528 A1* | 5/2004 | Walchuk et al. | 516/20 |
| 2009/0114394 A1 | 5/2009 | Javora et al. | |
| 2009/0285869 A1 | 11/2009 | Trimble | |
| 2010/0056399 A1 | 3/2010 | Berkland | |

FOREIGN PATENT DOCUMENTS

| | | |
|---|---|---|
| EP | 0461584 A2 | 12/1991 |
| FR | 1581186 A | 9/1969 |

OTHER PUBLICATIONS

International Search Report and the Written Opinion of the International Searching Authority for PCT/US2012/040827 (child PCT application).
European Patent Office, Extended European Search Report in European Patent Application No. 12796399.9, Jul. 1, 2015, 5 pp.
Organization for Economic Cooperation and Development, Procedure OECD 306, Jul. 17, 1992.

* cited by examiner

*Primary Examiner* — Aiqun Li
(74) *Attorney, Agent, or Firm* — Leydig, Voit & Mayer, Ltd.

(57) ABSTRACT

A water-in-oil emulsion composition and method of production is disclosed. The composition may comprise a monomer phase, an organic phase, at least one initiator, and an inverting phase. The monomer phase may further comprise at least one monomer, water, ammonium chloride, sodium 2-acrylamido-2-methyl-1-propanesulfonate, tetrasodium ethylenediaminetetraacetate, and at least one water soluble ethylenically unsaturated monomer. The organic phase may further comprise at least one hydrophobic solvent, lecithin, and a polyoxyethylene derivative of a sorbitan ester. The at least one monomer may be selected from the group consisting of an acrylic monomer, an acrylamide monomer, and combinations thereof.

15 Claims, No Drawings

ENVIRONMENTALLY FRIENDLY DISPERSION SYSTEM USED IN THE PREPARATION OF INVERSE EMULSION POLYMERS

FIELD OF THE INVENTION

This invention pertains to water-in-oil emulsion polymerization. More particularly, the invention pertains to an environmentally friendly, oil phase system used for making water-in-oil emulsion polymers.

BACKGROUND

Inverse emulsion polymerization is a process that produces high molecular weight, water-soluble polymer in a convenient package for application. In the process an aqueous monomer solution is emulsified within an inert hydrocarbon phase containing surfactants that promote water-in-oil ("w/o") emulsions. The resulting droplets are polymerized yielding polymer particles that are dispersed throughout the hydrocarbon phase and stabilized by surfactant.

Over time various emulsification systems have been discovered and utilized. In U.S. Pat. No. 3,284,393, Vanderhoff and Wiley espouse the use of conventional w/o emulsifiers such as, sorbitan monooleate, sorbitan monostearate, hexadecyl sodium phthalate, cetyl or stearyl sodium phthalte, and metal soaps.

U.S. Pat. No. 3,826,771, to Anderson and Frisque, also teaches the use of conventional w/o emulsifiers, showing the use of sorbitan monostearate in all of the examples.

U.S. Pat. No. 4,024,097, to Slovinsky and Hurlock, introduced partially esterified lower N,N'-dialkanol substituted fatty amides, salts of fatty tertiary amines, quaternary salts of fatty tertiary amines, alkali metal salts, and alkyl or alkyl aryl sulfates and sulfonates as w/o emulsifiers that yielded lattices with smaller particle size distributions and improved storage stability.

In U.S. Pat. No. 4,147,681, to Lim et al., w/o emulsifiers with a HLB of at least 7 were used and many examples were cited. Lim and U.S. Pat. No. 4,672,090, to Chan, made use of a system comprising a polyoxyethylene derivative of a sorbitan ester, sorbitan monooleate, and alkanolamide.

In U.S. Pat. No. 4,906,701, to Clark, an inverse emulsion system utilizing polyoxyethylene sorbitol esters, polyoxyethylene fatty alcohols with a HLB of 7-9, and glycerides was revealed.

U.S. Pat. No. 5,206,316, to Chuang, revealed the use of nonionic oil-soluble surfactant and a compound selected from, N-alkyl lactams, and an alkylated polymer of a N-vinyl lactam.

With this in mind, it was desired to create an environmentally friendly oil phase system useful for making inverse emulsion polymers. The adopted definition of environmentally friendly are the rules that govern offshore chemical use in the North Sea. The environmental impact of a chemical is defined by three tests: bioaccumulation, biodegradation and toxicity. In order for a chemical to be used without restriction offshore in the North Sea it must satisfy two of the following three criteria:

1. Biodegradation must be greater than 60%, if less than 20% it is automatically marked for substitution.
2. Bioaccumulation as measured by octanol/water partitioning coefficient (log Po/w) must be below 3 (or have a molecular weight>700).
3. Toxicity to the most sensitive marine species (typically Skeletonema) must be greater than LC50 or EC50 of 10 ppm.

One of the most popular and conventional w/o emulsifiers, sorbitan monooleate, does not pass the biodegradation and bioaccumulation protocols that govern offshore chemical use in the North Sea. For the initial assessment procedure, one must use marine biodegradation data as outlined in Organization for Economic Cooperation and Development, Procedure OECD 306 or BODIS. Sorbitan monooleate has a BODIS result of 32%, which coupled with log P>3 prevents sorbitan monooleate from passing the test. Other governing bodies allow the use of other types of biodegradation data such as the OECD 301 series (freshwater) to prove a chemical's non-harm to the environment, but not for use in offshore applications. This prompted an investigation into other w/o surfactant systems that could be used to produce inverse emulsion polymers.

Lecithin is well known as an emulsifier and has been used in w/o emulsion technology in explosives. A number of publications illustrate this application including U.S. Pat. Nos. 3,535,174; 4,308,081; 4,357,184; 4,473,418; 4,507,161; and 4,602,970. Of particular interest, U.S. Pat. Nos. 4,943,389 and 5,008,037 indicate that lecithin can be an inferior emulsifier for w/o emulsions. The patents teach that lecithin can be made into a better w/o emulsifier after subjection to a thermal process. Although inverse emulsions using lecithin are well known in the literature, not all inverse emulsions can go through the polymerization process and provide usable product.

Accordingly, there is a need for an environmentally friendly, oil phase system used for making water-in-oil emulsion polymers. Desirably, the oil phase system is biodegradable according to current environmental standards. More desirably, the oil phase system is comprised of substances recognized worldwide as generally safe for use.

SUMMARY OF THE INVENTION

The present invention is directed toward a water-in-oil emulsion composition. The composition comprises an aqueous phase, an organic solvent, and lecithin. Additionally, the composition may optionally comprise a nonionic surfactant, and the nonionic surfactant may comprise at least one polyoxyethylene derivative of a sorbitan ester.

The present invention is alternately directed toward a water-in-oil dispersion composition. The composition results from a polymerization. The composition comprises a polymer phase, an organic phase, at least one initiator, and an inverting phase. The polymer phase is created from a monomer phase. The polymer phase may further comprise water, an inorganic salt, and a polymer created from at least one water soluble ethylenically unsaturated monomer. The organic phase may further comprise at least one hydrophobic solvent and lecithin. The at least one water soluble ethylenically unsaturated monomer may comprise at least one of an acrylic monomer and an acrylamide monomer. The inverting surfactant may be added after the polymer phase is created from the monomer phase. The organic phase of the water-in-oil emulsion composition may additionally comprise a polyoxyethylene derivative of a sorbitan ester.

The present invention is alternately directed toward a method for producing a water-in-oil polymer dispersion. The method comprises emulsifying an aqueous monomer solution in an organic phase, and polymerizing the aqueous monomer emulsion. The emulsifying forms an aqueous monomer emulsion. The polymerizing forms the water-in-oil polymer dispersion. The at least one monomer comprises at least one of an acrylic monomer and an acrylamide monomer, and the organic phase comprises lecithin and an organic liquid. The organic phase may additionally comprise a polyoxyethylene derivative of a sorbitan ester.

These and other features and advantages of the present invention will be apparent from the following detailed description, in conjunction with the appended claims.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

An embodiment of the present invention is an environmentally friendly oil phase system comprising an organic solvent and lecithin. The immiscible organic solvent can be a hydrocarbon solvent that is aliphatic or at least one oil derived from one or more natural products, and are at least 60% biodegradable after 28 days as determined by the Organization for Economic Cooperation and Development, Procedure OECD 306, its text incorporated by reference. One or more non-ionic surfactants may be used. A preferred non-ionic surfactant is comprised of polyoxyethylene derivatives of a sorbitan ester that have a HLB of 9-10.

It is important to define some of the nomenclature used within this disclosure. A monomer phase within a hydrocarbon solvent is an inverse emulsion because such a composition is a liquid dispersed within another liquid. During polymerization, the liquid droplets become solid particles that are dispersed within the hydrocarbon solvent, creating a dispersion. Formally, a dispersion is solid particles dispersed within another phase. Acknowledgement of difference between an emulsion and a dispersion is important when dealing with the invention at hand.

The final component is lecithin, which can be obtained from sources such as soybean lecithin. The United States Food and Drug Administration has given lecithin the status of Generally Recognized As Safe ("GRAS"), and the European body OSPAR that governs offshore chemical use in the North-East Atlantic has given lecithin the status of Poses Little Or NO Risk ("PLONOR"). Chemicals with PLONOR status are inherently acceptable for use in the North Sea.

Inverse emulsion polymers can be created with lecithin and the polyoxyethylene derivative of a sorbitan ester dispersion system. Evidence of the environmentally friendly oil phase system is shown in Table 1, which shows the environmental profile for an aliphatic hydrocarbon solvent and two surfactants that can be used in the dispersion system.

TABLE I

Environmental profile of dispersion system components.

| component | Toxicity $EC_{50}$ (ppm) | Bioaccumulation log $P_{o/w}$ | Biodegradation, t = 28 days |
|---|---|---|---|
| aliphatic hydrocarbon | >1800 | >3 | 100 |
| POE(4)-sorbitan monostearate | 165 | <3 | 27 |
| POE(5)-sorbitan monooleate | 20 | <3 | 52 |

In an embodiment, the organic solvent may be an aliphatic hydrocarbon. The aliphatic hydrocarbon may be derived from a natural product.

In an embodiment, the organic solvent may be a fatty ester. The fatty ester may be derived from a natural product.

In an embodiment, the organic solvent may be at least 60% biodegradable after 28 days.

In an embodiment, the polyoxyethylene derivative may have a hydrophilic-lipophilic balance within the range from about 9 to about 10.

In an embodiment, the lecithin has not been subject to a thermal process.

In an embodiment, the aqueous phase is selected from at least one of a brine solution, an acid solution, a water soluble polymer solution, a gel, and a solid.

The polymer created by the invention may be anionic, cationic, nonionic, amphoteric, or a betaine-containing polymer.

There are several envisioned uses for the invention. First, the invention may be used to produce inverse emulsion polymers that could be used as friction (drag) reducers during pressure pumping operations, or an acid gellant in a crude oil recovery process. As an acid gellant, the invention could be used to produce stable gelled acid, and as a friction reducer when applied in low doses to fluids in turbulent flow. The invention could improve acid fracturing by allowing deeper penetration of the acid. The invention may be used as a hydrate inhibitor, as a clay stabilizing agent, or as a de-emulsifier. The invention may also improve pressure pumping by suppressing turbulent flow and minimizing the energy loss between the fluid and its surroundings. The invention may be particularly useful in the treatment of a subterranean formation of an oil production operation and/or a gas production operation, i.e., those applications that attempt to pump crude oil to the surface at steady state. Background information related to the aforementioned applications can be found in U.S. Patent Application Publication No. 2010/0056399, paragraphs [0048]-[0079], which are hereby incorporated by reference.

For oil and gas recovery operations, it is often desirable to reduce water production. To reduce the water production, a common technique used is to inject a polymer solution together with a cross-linking agent in order to form gels capable of reducing water permeability without affecting oil productivity. The well treatment success depends on the in situ formation of the gel after that the effective placement of the solution polymer in the porous media.

In many instances, it is desirable to delay the gel formation with the controlled release of cross-linking agents. As disclosed in U.S. Patent Application Publication No. 2010/0056399 to Berkland et al. ("Berkland"), the polyelectrolyte complexes are useful for delivering gel-forming or cross-linking agents over a period of time. Any conventional cross-linking agent can be used. Exemplary agents are generally described in Moradi-Arghai et al., U.S. Pat. No. 6,387,986, which is incorporated by reference.

The cross-linking agents can be ionic (e.g., Cr(III) in $CrCl_3$, etc.), organo-metallic (e.g., Cr(III) acetate, see Sydansk, SPE 17329. A new conformance-improvement-treatment Chromium (III) gel technology (1988)), Al(IV) citrate or Zr(IV) lactate or citrate (see Cui et al., "Preparation of a retarded crosslinking system with HPAM and Zirconium citrate," *J. Petro. Univ. China,* 1992, 16(3):40-55) or organic (polyethylenimine or phenol-formaldehyde). See also Sydansk, U.S. Pat. No. 6,103,772 entitled "Foamed gel for permeability reduction or mobility control in a subterranean hydrocarbon-bearing formation," which is incorporated by reference. Hydrolyzed polyacrylamides have been cross-linked with the mentioned polyvalent cations. Acrylamide copolymers have been organically cross-linked with cations or polyethylenimine (Hardy et al., SPE 50738, *The first carbonate field-application of a new organically crosslinked water shutoff polymer system* (1999)).

Generally, the cross-linking agent is selected from the group consisting of multivalent metallic compounds and organic cross-linking agents. Exemplary multivalent metal compounds include a complexed zirconium compound, a complexed titanium compound, a complexed chromium compound, a complexed aluminum compound, a complexed tin compound, a complexed iron compound, and mixtures thereof. The term "complexed" as used in reference to a gel-forming or cross-linking agent means a compound formed by the union of a metal ion with a nonmetallic ion or molecule called a ligand. Suitable multivalent metallic compounds are selected from the group consisting of zirconium citrate, zirconium tetrachloride, zirconium oxychloride, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium nitrate, chromium chloride, chromium citrate, chromium acetate, chromium propionate, and combinations of any two or more thereof. Most preferred cross-linking agents include chromium chloride, chromium propionate, chromium acetate, zirconium acetylacetonate, zirconium tetrachloride, zirconium oxychloride, zirconium lactate, zirconium citrate, zirconium malonate, tetrakis(triethanolamine) zirconate, zirconium complex of hydroxyethyl glycine, zirconium tartarate, zirconium propionate, titanium acetylacetonate, titanium ethylacetoacetate, titanium citrate, titanium triethanolamine, and combinations of any two or more thereof.

An organic cross-linking agent can also be utilized in said gel-forming composition. For example, said organic cross-linking agent can be selected from the group consisting of formaldehyde; precursors of formaldehyde, such as, hexamethylenetetramine; furfuryl alcohol; aminobenzoic acid; phenol and phenolic derivatives, such as hydroquinone, phloroglucinol, catechol, resorcinol, salicylic acid, salicylamide, and vanillin. A more detailed description of organic cross-linking agents can be found in U.S. Pat. Nos. 5,399,269 and 5,480,933, herein incorporated by reference.

When a well bore is initially drilled in an oil field, the oil extracted is usually "dry," being substantially free of aqueous impurities. However, as the oil reserves dwindle, a progressively greater quantity of aqueous impurities becomes mixed with the oil. Changes in formation physical conditions during the production cycle as well as mixing of incompatible waters (i.e., sea water and barium or strontium containing formation waters) can cause scaling in any part of the production system. Scale that occurs in the production system can result in a significant loss in production and associated revenue.

As used herein, the term "scale" refers to a deposit or coating formed on the surface of metal, rock or other material, such as a conduit. Scale is caused by a precipitation due to a chemical reaction with the surface, precipitation caused by chemical reactions, a change in pressure or temperature, or a change in the composition of a solution. Typical scales are calcium carbonate, calcium sulfate, barium sulfate, strontium sulfate, iron sulfide, iron oxides, iron carbonate, the various silicates and phosphates and oxides, or any of a number of compounds insoluble or slightly soluble in water.

As disclosed in Berkland, polyelectrolyte complexes are used to deliver scale inhibitors to the oil or gas well. Various scale inhibitors are known to those of skill in the art. The dissolution of sulfates scales can be readily dissolved using strong chelating agents like ethylenediamine tetra acetic acid ("EDTA") and diethylenetriamino-pentaacetic acid ("DTPA"), which form a surface complex when in contact with scale. The dissolution rate is controlled by desorption and diffusion of complexes (Ba-EDTA/DTPA) (Heriot-Watt University, FAST Team, 2005, Scale Dissolvers. http://pet.hw.ac.uk/research/fast1/research/scla_diss.htm).

A common scale control technique consists of squeezing a scale inhibitor into the formation rock where it is adsorbed or precipitates as a complex on the surface. When production is restored, the scale inhibitor dissolves or desorbs into the brine, preventing scale formation. See Andrei and Gagliardi, "Redissolution studies in bulk and coreflood for PPCA scales inhibitor," *J. Petrol. Sci. & Eng'g,* 43, 35-55 (2004). The development of biodegradable polymers, especially phosphorus containing polymers as scale inhibitors, has also been stimulated for new environmental regulations, such as those described in Woodward, WO 2004/056886, entitled "Biodegradable Polymers."

Common chemistries for scale inhibitors include phosphonates, polymers like the polyacrylic acid, and phosphate esters. In general, scale inhibitors include water-soluble organic molecules having at least 2 carboxylic and/or phosphonic acid and/or sulfonic acid groups, e.g., 2-30 such groups. Preferred scale inhibitors are oligomers or polymers, or may be monomers with at least one hydroxyl group and/or amino nitrogen atom, especially in hydroxycarboxylic acids or hydroxy or aminophosphonic, or, sulfonic acids. Scale inhibitors are used primarily for inhibiting calcium and/or barium scale. Examples of such compounds used as scale inhibitors are aliphatic phosphonic acids having 2-50 carbons, such as hydroxyethyl diphosphonic acid, and aminoalkyl phosphonic acids, e.g., polyaminomethylene phosphonates with 2-10 N atoms, e.g., each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different (e.g., as described further in published EP-A-479462, the disclosure of which is herein incorporated by reference). Other scale inhibitors are polycarboxylic acids such as acrylic, maleic, lactic or tartaric acids, and polymeric anionic compounds such as polyvinyl sulfonic acid and poly(meth) acrylic acids, optionally with at least some phosphonyl or phosphinyl groups as in phosphinyl polyacrylates. The scale inhibitors are suitably at least partly in the form of their alkali metal salts, e.g., sodium salts.

In one aspect, examples of scale inhibitors that are suitable for use include hexamethylene diamine tetrakis(methylene phosphonic acid), diethylene triamine tetra(methylene phosphonic acid), diethylene triamine penta(methylene phosphonic acid), bis-hexamethylene triamine pentakis(methylene phosphonic acid), polyacrylic acid ("PAA"), phosphino carboxylic acid ("PPCA"); diglycol amine phosphonate ("DGA phosphonate"); 1-hydroxyethylidene 1,1-diphosphonate ("HEDP phosphonate"); bisaminoethylether phosphonate ("BAEE phosphonate") and polymers of sulfonic acid on a polycarboxylic acid backbone. Other suitable scale inhibitors include, for example, polyphosphates and polycarboxylic acids and copolymers such as described in U.S. Pat. No. 4,936,987.

The success of a scale inhibitor treatment depends on the length of time (squeeze lifetime) that the inhibitor is released to prevent scale formation. The squeeze lifetime can be increased by using polyelectrolyte complexes with a surface charge that is opposite to that of the formation rock. The release time could be adjusted entrapping the scale inhibitor in a polyelectrolyte complex.

As disclosed in Berkland, the polyelectrolyte complexes are also useful for controlling the release of corrosion inhibitors in oil and gas wells. An example of a cathodic inhibitor is zinc oxide that retards the corrosion by inhibiting the reduction of water to hydrogen gas. Corrosion inhibitors are typically organic-amine based compounds like hexamine, phenylenediamine, dimethylethanoamine, sodium nitrite, imidazoline derivatives, etc. Most inhibitors are organic, cationic, nitrogen-based chemistries. Linear or cyclic amines, fatty acids, or quaternary amines chemistries are common. A preferred corrosion inhibitor is benzyldimethyltetradecylarnmonium chloride. Carrier fluids can be water, alcohol or hydrocarbons (PTTC Corrosion Management Workshop, Farmington, N. Mex. (2002)).

Examples of corrosion inhibitors are compounds for inhibiting corrosion on steel, especially under anaerobic conditions, and may especially be film formers capable of being deposited as a film on a metal surface, e.g., a steel surface such as a pipeline wall. Such compounds may be non-quaternized long aliphatic chain hydrocarbyl N-heterocyclic compounds, where the aliphatic hydrocarbyl group may be as defined for the hydrophobic group above; mono- or di-ethylenically unsaturated aliphatic groups, e.g., of 8-24 carbons such as oleyl are preferred. The N-heterocyclic group can have 1-3 ring nitrogen atoms with 5-7 ring atoms in each ring; imidazole and imidazoline rings are preferred. The ring may also have an aminoalkyl, e.g., 2-aminoethyl or hydroxyalkyl, e.g., 2-hydroxyethyl substituent. Oleyl imidazoline may be used. Where corrosion inhibitors are released using the polyelectrolyte complexes, these inhibitors are effective in reducing corrosion of metal surfaces as they are produced out of the well.

Arterial blockage in the petroleum industry is mostly due to the deposition of heavy organics from petroleum fluids. Heavy organics such as paraffin/wax, resin, asphaltene, diamondoid, mercaptans, and organometallic compounds may exist in crude oil in various quantities and forms. Such compounds could precipitate out of the crude oil solution due to various forces causing blockage in the oil reservoir, in the well, in the pipelines and in the oil production and processing facilities. The polyelectrolyte complexes are useful for controlling the release of inhibitors of such compounds to the oil and gas well.

Aphaltene inhibitors include amphoteric fatty acid or a salt of an alkyl succinate while the wax inhibitor may be a polymer such as an olefin polymer, e.g., polyethylene or a copolymeric ester, e.g., ethylene-vinyl acetate copolymer, and the wax dispersant may be a polyamide.

The polyelectrolyte complexes are also useful for controlling the release of hydrogen sulfide scavengers in oil and gas wells. As disclosed in Berkland, the hydrogen sulfide scavengers preferably remove all soluble sulfide species, $H_2S$, $S^{-2}$ and $HS^-$, and forms a product that is nonhazardous and noncorrosive. Zinc compounds are commonly used to precipitate ZnS and decrease the concentration of all three sulfides that are in equilibrium in a solution to a very low concentration. For water mud, zinc basic carbonate, and, for oil mud, zinc oxide, are recognized to be effective sulfide scavengers.

The polyelectrolyte complexes are also useful for controlling the release of hydrate inhibitors in oil and gas wells. Hydrates are formed of two components, water and certain gas molecules, e.g., alkanes of 1-4 carbons, especially methane and ethane, such as those found in natural gas. These "gas" hydrates will form under certain conditions, e.g., when the water is in the presence of the gas and when the conditions of high pressure and low temperature reach respective threshold values. The gas may be in the free state or dissolved in a liquid state, for example, as a liquid hydrocarbon.

The hydrate inhibitors are often use in combination with a corrosion inhibitor and optionally a water soluble polymer of a polar ethylenically unsaturated compound. Preferably, the polymer is a homopolymer or a copolymer of an ethylenically unsaturated N-heterocyclic carbonyl compound, for example, a homopolymer or copolymer of N-vinyl-omega caprolactam. Such hydrate inhibitors are disclosed in U.S. Pat. Nos. 6,436,877, 6,369,004, EP 0770169 and WO 96/29501 which are herein incorporated by reference.

Oil well stimulation typically involves injecting a fracturing fluid into the well bore to create fractures in the rock formation surrounding the bore. The fracturing fluid typically contains a water soluble polymer, such a guar gum or a derivative thereof, which provides appropriate flow characteristics to the fluid and suspends the proppant particles therein. When pressure on the fracturing fluid is released and the fracture closes around the propping agent, water is forced therefrom and the water-soluble polymer forms a compacted cake. This compacted cake can prevent oil or gas flow if not removed. To solve this problem, "breakers" are included in the fracturing fluid.

As disclosed in Berkland, the breakers are associated with the polyelectrolyte complexes for controlled or delayed release. The breakers may be either enzymatic breakers or oxidative breakers. Examples of such breakers include oxidizers such as sodium persulfate, potassium persulfate, magnesium peroxide, ammonium persulfate, and the like. Enzyme breakers that may be employed include alpha and beta amylases, amyloglucosidase, invertase, maltase, cellulase, pectinase, and hemicellulase. See generally Gulbis, "Fracturing Fluid Chemistry," *Reservoir Stimulation*, Chapter 4 (J. J. Economides and K. G. Nolte, Eds., 2d Ed. 1989); U.S. Pat. No. 4,996,153 (heat-stable enzyme breaker which may be used as a viscosity breaker in oil recovery, breaker is a xanthanase for degrading xanthan-based rather than guar-based fracturing fluids); U.S. Pat. No. 5,201,370 (enzyme breakers for galactomannan-based fracturing fluids); U.S. Pat. No. 4,250,044 (tertiary amine/persulfate breaker system); WO 91/18974 (hemicellulase enzyme), all of which are incorporated by reference.

The basic physics behind the surfactant flooding enhanced oil recovery ("EOR") process is that the residual oil dispersed as micron-size ganglia is trapped by high capillary forces within the porous media. Increasing the fluid flow viscous forces or decreasing the capillary forces holding the oil in place are required before the oil can be pushed through the pore throats and sent on to a production well. The interfacial tension between the crude oil and the aqueous phase needs to be reduced to ultra-low values, (target 0.001 mN/m), several orders of magnitude below that of a typical reservoir brine-oil system, if the residual oil is to be mobilized through the injection of surfactant solutions. The main challenge with surfactant flooding is the tendency of the surfactant molecules to precipitate when coming into contact with the formation brine. The polyelectrolyte complexes can entrap or encapsulate and therefore protect the surfactant molecules from the formation brine.

Surfactants associated with the polyelectrolyte complexes may be anionic, cationic, amphoteric, or nonionic surface active agents. Suitable anionic surfactants include, but are not limited to, those containing carboxylate, sulfonate, and sulfate ions. Examples for anionic surfactants are sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene (15), and coconut amine. Examples of nonionic surfactants include, but are not limited to, ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene (8) monolaurate, polysorbates, polyoxyethylene (9) octylphenylether, PEG-1000 cetyl ether, polyoxyethylene (3) tridecyl ether, polypropylene glycol (18) butyl ether, Poloxamer 401, stearoyl monoisopropanolamide, and polyoxyethylene (5) hydrogenated tallow amide. Examples for amphoteric surfactants include, but are not limited to, sodium N-dodecyl-beta-alanine, sodium N-lauryl-beta-iminodipropionate, myristoamphoacetate, lauryl betaine, and lauryl sulfobetaine.

Most preferred surfactants used in EOR include alkyl aryl sulfonates, alkyl sulfates as sodium dodecyl sulfate ("SDS"), alcohol propoxylate sulfate. See generally Wu et al., SPE 95404: *A Study of Branched Alcohol Propoxylate Sulfate Surfactants for Improved Oil Recovery* (2005).

Another use of the invention involves its use as an environmentally friendly acid emulsifier. The emulsion would act to retard the action of acid on acid-soluble formation rock, again typically found in the crude oil recovery process. Because the invention is environmentally friendly, its user would be less of a threat to the environment than perhaps other emulsifiers.

Several other envisioned uses of the invention include its use as an environmentally friendly dispersion system useful for the preparation or packaging of friction reducer, a scale inhibitor, or a hydrate inhibitor, depending on a particular application.

The following examples are meant to be illustrative and not limit the invention.

EXAMPLES

General Procedure

The following is a general procedure for the preparation of a sodium 2-acrylamido-2-methyl-1-propanesulfonate and acrylamide copolymer. The continuous phase is prepared by dissolving the emulsifying surfactants in the hydrocarbon solvent. The dispersed phase is prepared by dissolving sodium or ammonium chloride in acrylamide and water. 2-Acrylamido-2-methyl-1-propanesulfonic acid sodium salt solution is then added to the monomer phase followed by tetrasodium ethylenediaminetetraacetate. After all of the solids are dissolved, the monomer phase is added to the oil phase and the emulsion is formed with adequate mixing. Typically a 1 kg emulsion is subjected to 60 seconds of mixing with a high shear rotor/stator laboratory mixer set at 5000 rpm. After the high shear mixing, the initiators are added and the system mixed with overhead stirring at 650 rpm while purging nitrogen. The reaction begins at around 43° C. and is run isothermally for approximately 3 hours. At the end of three hours, the temperature is increased to 70° C. for one hour to lower residual monomer levels. After cooling to approximately 38-40° C., the inverting surfactant is added to help the dispersion break when it is dispersed into an aqueous solution.

Example 1

Table II below illustrates the formulation for this example prepared by following the general procedure outlined above. The resulting latex had a bulk viscosity of 693 cP when measured as Brookfield viscosity at room temperature with a #2 spindle at 30 rpm. The viscosity of an inverted 1% product solution in synthetic Nalco water was 277 cP using the same technique. The reduced specific viscosity ("RSV") of a 450 ppm polymer solution in 1-molar sodium nitrate was 20.3 dL/g using an Ubbelohde viscometer and the equation $RSV=(1/c)[t/t_0-1]$ where c=concentration, $t_0$=time of flow for solvent, and t=time of flow for polymer solution.

TABLE II

Ingredients used for making NaATBS-acrylamide copolymer of Example 1.

|  | wt % |
|---|---|
| MONOMER PHASE | |
| acrylamide solution(49.5% in water) | 38.737 |
| water | 14.247 |
| sodium chloride | 3.903 |
| 2-acrylamido-2-methyl-1-propanesulfonic acid sodium salt solution(58% in water) | 14.441 |
| tetrasodium EDTA | 0.017 |
| OIL PHASE | |
| hydrocarbon solvent | 22.774 |
| soy lecithin | 1.952 |
| POE (4) sorbitan monostearate | 1.952 |
| INITIATORS | |
| 2,2'-azobisisobutyronitrile | 0.023 |
| 2,2'-azobis(2,4-dimethylvaleronitrile) | 0.003 |
| INVERTING SURFACTANT | |
| ethoxylated fatty alcohol | 1.951 |
| TOTAL | 100.000 |

Example 2

Table III below illustrates the formulation for this example prepared by following the general procedure outlined above, except adding the post-treatment chemicals indicated in the table. The resulting latex had a bulk viscosity of 494 cP when measured as Brookfield viscosity at room temperature with a

2 spindle at 30 rpm. The viscosity of an inverted 1% product solution in Sugar Land, Tex., tap water was 238 cP using the same technique. The reduced specific viscosity of a 450 ppm polymer solution in 1-molar sodium nitrate was 19.9 dL/g.

TABLE III

Ingredients used for making NaATBS-acrylamide copolymer of Example 2.

|  | wt % |
|---|---|
| MONOMER PHASE | |
| acrylamide solution (49.5% in water) | 42.096 |
| water | 4.254 |
| ammonium chloride | 4.000 |
| 2-acrylamido-2-methyl-1-propanesulfonic acid sodium salt solution (58% in water) | 15.798 |
| tetrasodium EDTA | 0.020 |
| OIL PHASE | |
| hydrocarbon solvent | 25.500 |
| soy lecithin | 2.267 |
| POE (5) sorbitan monooleate | 1.733 |
| INITIATORS | |
| 2,2'-azobisisobutyronitrile | 0.023 |
| 2,2'-azobis(2,4-dimethylvaleronitrile) | 0.009 |
| POST-TREATMENT | |
| sodium metabisulfite | 0.200 |
| ammonium thiosulfate | 1.000 |
| INVERTING SURFACTANT | |
| ethoxylated fatty alcohol | 3.100 |
| TOTAL | 100.000 |

Example 3

Table IV below illustrates the formulation for this example prepared by following the general procedure outlined above, except adding the post-treatment chemicals indicated in the table. The resulting latex had a bulk viscosity of 1200 cP when measured as Brookfield viscosity at room temperature with a #3 spindle at 30 rpm. The viscosity of an inverted 1% product solution in synthetic Nalco water was 254 cP when measured as Brookfield viscosity at room temperature with a #2 spindle at 30 rpm. The reduced specific viscosity of a 450 ppm polymer solution in 1-molar sodium nitrate was 17.5 dL/g.

TABLE IV

Ingredients used for making NaATBS-acrylamide copolymer of Example 3.

|  | wt % |
|---|---|
| MONOMER PHASE | |
| acrylamide solution (49.5% in water) | 41.200 |
| water | 2.7617 |
| ammonium chloride | 3.9100 |
| 2-acrylamido-2-methyl-1-propanesulfonic acid sodium salt solution (58% in water) | 15.4600 |
| tetrasodium EDTA | 0.0170 |
| OIL PHASE | |
| hydrocarbon solvent | 24.9480 |
| soy lecithin | 2.7300 |
| POE (4) sorbitan monostearate | 1.6000 |
| POE (5) sorbitan monooleate | 2.4500 |
| INITIATORS | |
| 2,2'-azobisisobutyronitrile | 0.0200 |
| 2,2'-azobis(2,4-dimethylvaleronitrile) | 0.0020 |
| POST-TREATMENT | |
| sodium metabisulfite | 0.1800 |
| sodium thiosulfate pentahydrate | 0.9700 |
| INVERTING SURFACTANT | |
| ethoxylated fatty alcohol | 3.7500 |
| TOTAL | 100.000 |

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the illustrated specific embodiments or examples is intended or should be inferred. The disclosure is intended to cover by the appended claims all such modifications as fall within the scope of the claims.

The invention claimed is:

1. A method of producing a water-in-oil polymer dispersion composition, the method comprising:
    forming an aqueous monomer inverse emulsion by emulsifying an aqueous monomer solution comprising water, at least one water soluble ethylenically unsaturated monomer and an organic salt in an organic phase comprising a fatty ester, a polyoxyethylene derivative of a sorbitan ester and lecithin, the aqueous monomer inverse emulsion further comprising at least one initiator;
    forming a water-in-oil polymer dispersion by polymerizing the at least one water soluble ethylenically unsaturated monomer of the aqueous monomer inverse emulsion, thereby forming a polymer phase comprising water, an inorganic salt, and the polymer formed by polymerizing the at least one water soluble ethylenically unsaturated monomer in the organic phase; and
    adding an inverting surfactant to the water-in-oil polymer dispersion, thereby producing the water-in-oil polymer dispersion composition;
    wherein the polyoxyethylene derivative of a sorbitan ester is selected from the group consisting of: POE(4)-sorbitan monostearate, POE(5)-sorbitan monooleate, and combinations thereof.

2. The method of claim 1, wherein the polyoxyethylene derivative of a sorbitan ester is POE(4)-sorbitan monostearate.

3. The method of claim 1, wherein the polyoxyethylene derivative of a sorbitan ester is POE(5)-sorbitan monooleate.

4. The method of claim 1, wherein the polymer is a copolymer of 2-acrylamido-2-methyl-1-propanesulfonate sodium salt and acrylamide.

5. The method of claim 1, wherein the inverting surfactant comprises an ethoxylated fatty alcohol.

6. The method of claim 1, wherein the resulting composition further comprises sodium metabisulfite.

7. The method of claim 1, wherein the resulting composition further comprises ammonium thiosulfate.

8. The method of claim 1, wherein the polyoxyethylene derivative of a sorbitan ester has a hydrophilic-lipophilic balance of from about 9 to about 10.

9. The method of claim 1, wherein the at least one water soluble ethylenically unsaturated monomer is a 2-acrylamido-2-methyl-1-propanesulfonate sodium salt and acrylamide.

10. The method of claim 1, wherein the lecithin is soy lecithin.

11. The method of claim 1, wherein the lecithin has not been subject to a thermal process.

12. The method of claim 1, wherein the organic salt is tetrasodium ethylenediaminetetraacetate.

13. The method of claim 1, wherein the hydrophobic solvent is at least 60% biodegradable after 28 days.

14. The method of claim 1, wherein the at least one initiator is 2,2'-azobisisobutyronitrile and 2,2'-azobis(2,4-dimethylvaleronitrile).

15. The method of claim 1, wherein the inverting surfactant is an ethoxylated fatty alcohol.

* * * * *